(12) United States Patent
Hu et al.

(10) Patent No.: US 11,394,929 B2
(45) Date of Patent: Jul. 19, 2022

(54) SYSTEM AND METHOD FOR LANGUAGE-GUIDED VIDEO ANALYTICS AT THE EDGE

(71) Applicant: SAMSUNG ELECTRONICS CO., LTD., Suwon-si (KR)

(72) Inventors: Zhiming Hu, Toronto (CA); Iqbal Ismail Mohomed, Toronto (CA); Ning Ye, Toronto (CA); Caleb Ryan Phillips, Toronto (CA); Timothy Paul Capes, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/224,304

(22) Filed: Apr. 7, 2021

(65) Prior Publication Data

US 2022/0086401 A1    Mar. 17, 2022

Related U.S. Application Data

(60) Provisional application No. 63/077,327, filed on Sep. 11, 2020.

(51) Int. Cl.
*H04N 7/18* (2006.01)
*H04N 7/08* (2006.01)
(Continued)

(52) U.S. Cl.
CPC ........... *H04N 7/183* (2013.01); *G06F 40/279* (2020.01); *G06K 9/6215* (2013.01); *G06V 20/46* (2022.01); *H04N 7/08* (2013.01)

(58) Field of Classification Search
CPC ........ H04N 7/183; H04N 7/08; G06F 40/279; G06V 20/46; G06K 9/6215
See application file for complete search history.

(56) References Cited

U.S. PATENT DOCUMENTS 9,836,671 B2    12/2017 Gao et al.
10,691,925 B2    6/2020 Ng et al.
(Continued)

OTHER PUBLICATIONS

Antoine Miech et al., "Learnable pooling with Context Gating for video classification", arXiv: 17060.06905, 2017, 8 pages total, URL: https://arxiv.org/abs/1706.06905.
(Continued)

*Primary Examiner* — Sunghyoun Park
(74) *Attorney, Agent, or Firm* — Sughrue Mion, PLLC (57) ABSTRACT

Training a classifier using embeddings and building a latent space is disclosed. The embeddings may be based on weights in a trained machine learning model. Also, operation of the classifier to process video segments in real-time using the using the weights and the latent space is disclosed. The embeddings and the latent space allow the classification to be performed at an overall reduced dimensionality. The latent space is designed to efficiently scale with an increasing number of queries to permit fast search through the space. Embodiments permit real-time operation on video with dynamic features. The classifier reduces the bandwidth demand of video camera-equipped devices at a network edge by setting aside, accurately, non-informative video sequences rather than uploading video too many things over the network. Applications include security cameras, robots and augmented reality glasses.

20 Claims, 10 Drawing Sheets

(51) Int. Cl.
    *G06K 9/62*            (2022.01)
    *G06F 40/279*        (2020.01)
    *G06V 20/40*         (2022.01)

(56)                 References Cited

U.S. PATENT DOCUMENTS

| | | | |
|---|---|---|---|
| 2014/0009682 A1* | 1/2014 | Cheng | H04N 5/14 348/571 |
| 2016/0253679 A1* | 9/2016 | Venkatraman | G06Q 50/184 705/310 |
| 2021/0089571 A1* | 3/2021 | Perone | G06F 40/216 |

OTHER PUBLICATIONS Yury Malkov et al., "Approximate Nearest Neighbor Algorithm based on Navigable Small World Graphs", Elsevier, Information Systems, 45, 2014, pp. 61-68, 8 pages total.
Jacob Devlin et al., "BERT: Pre-training of Deep Bidirectional Transformers for Language Understanding", arXiv:1810.04805, 2018, 16 pages total, URL: https://arxiv.org/abs/1810.04805.
"MobileNetV2 Feature Extractor", imagenet/mobilenet_v2_100_224/feature_vector, Feature vectors of images with MobileNet V2 (depth multiplier 1.00) trained on ImageNet (ILSVRC-2012-CLS)., TensorFlow, (accessed/downloaded on Apr. 5, 2021), 1 page total, URL: https://tfhub.dev/google/imagenet/mobilenet_v2_100_224/feature_vector/4.
Relja Arandjelovic et al., "NetVLAD: CNN architecture for weakly supervised place recognition", arXiv:1511.07247, 2016, 17 pages total, URL: https://arxiv.org/abs/1511.07247.

* cited by examiner

Example of the Latent Space, S 1-3 as a Graph with Vertices and Edges. The set of vertices includes the set of vectors T1, ..., TN included in S 1-3 (see FIG. 6)

SYSTEM AND METHOD FOR LANGUAGE-GUIDED VIDEO ANALYTICS AT THE EDGE

CROSS REFERENCE TO RELATED APPLICATION

This application claims benefit of priority of U.S. Provisional Application No. 63/077,327 filed Sep. 11, 2020, the contents of which are hereby incorporated by reference.

FIELD

The present disclosure is related to reducing demanded bandwidth of a network at the edge of the network.

BACKGROUND

Video cameras are widely deployed, for example, for home security cameras, home robots and augmented reality (AR) glasses. This leads to millions of video frames generated per camera per day. In many of these scenarios, a content of video needs to be analyzed in real time before retaining only frames of interest to be forwarded, for example, through a network to a server for further processing, storage, or decision making.

SUMMARY

A problem exists in uploading video content from video cameras deployed at the edge of networks. For example, a problem of inefficient use of network bandwidth can be created by home security cameras demanding network bandwidth for upload of captured frames through the network. Uninformative video segments need to be filtered out and only relevant frames are passed to the cloud, e.g., off-site or external servers or computers. A problem exists in finding a computationally efficient way to perform the filtering. Some approaches use annotated training data for each object to be detected. However, such annotated training data is not practical to dynamically support new queries. Also, a problem exists in the tradeoff between completing a computational task quickly and obtaining good results in terms of properly identifying which frames are informative and should be uploaded.

Training a classifier using embeddings and building a latent space is disclosed. The embeddings may be based on weights in a trained machine learning model. Also, operation of the classifier to process video segments in real-time using the weights and the latent space is disclosed. The embeddings and the latent space allow the classification to be performed at an overall reduced dimensionality, thus permitting real-time operation on devices with limited CPU power. The classifier reduces the bandwidth demand of video camera-equipped devices at a network edge by setting aside non-informative video sequences before uploading video over the network. Applications include security cameras, robots and augmented reality glasses.

More specifically, embodiments provided herein include an apparatus for analyzing incoming frames and matching the incoming frames to predefined user queries. The apparatus is configured to encode a set of queries expressed in natural language and process a window of incoming frames into fixed-sized embeddings. A trained model maps them into a joint embedding space, sometimes referred to herein as a latent space. In some embodiments, cosine similarities are computed between video and text embeddings to determine the relevant frames matching with a query. The apparatus is also configured to accept unseen queries as similar queries would be in close proximity with one another in the shared embedding space.

The apparatus provided herein is configured to detect and filter incoming frames based on user-specified events (in natural language) in camera-based streaming applications. The apparatus represents both text data and video data as compact embeddings, allowing complex queries to be used. The apparatus can be trained once with a training set of queries, and one or more additional queries can be added afterwards without re-training. The apparatus uses an efficient mapping algorithm to find the closest video and text embedding pair, which speeds up computation dramatically.

Thus, provided herein is a method of reducing, at a network edge, transmission bandwidth of video information of a video stream, the method including: extracting video features of a first portion of the video stream, the first portion of the video stream including a first plurality of video frames and corresponding to a first time period; forming, based on the video features, a first vector in a latent space; computing a first index of a first match of the first vector in the latent space, wherein a first similarity score is associated with the first index and the first match corresponds to a second vector in the latent space; determining if the first similarity score exceeds a similarity threshold; and when the similarity threshold is exceeded, transmitting first data related to the first index; wherein the second vector is pre-determined by: extracting text features of a natural language query, and forming, based on the text features, the second vector in the latent space.

Also provided herein is an apparatus including a processor and memory, wherein the processor is positioned at a network edge for reducing transmission bandwidth of video information of a video stream, the memory including instructions, wherein the processor is configured to: extract video features of a first portion of the video stream, the first portion of the video stream including a first plurality of video frames and corresponding to a first time period; form, based on the video features, a first vector in a latent space; compute a first index of a first match of the first vector in the latent space, wherein a first similarity score is associated with the first index and the first match corresponds to a second vector in the latent space; determine if the first similarity score exceeds a similarity threshold; and when the similarity threshold is exceeded, transmit first data related to the first index; wherein the processor is further configured to pre-determine the second vector by: extracting text features of a natural language query, and forming, based on the text features, the second vector in the latent space.

Also provided herein is a non-transitory computer readable medium including instructions, the instructions configured to cause one or more processors to: extract video features of a first portion of a video stream, the first portion of the video stream including a first plurality of video frames and corresponding to a first time period; form, based on the video features, a first vector in a latent space; compute a first index of a first match of the first vector in the latent space, wherein a first similarity score is associated with the first index and the first match corresponds to a second vector in the latent space; determine if the first similarity score exceeds a similarity threshold; and when the similarity threshold is exceeded, transmit first data related to the first index; wherein the second vector is pre-determined by: extracting text features of a natural language query, and forming, based on the text features, the second vector in the latent space.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1:
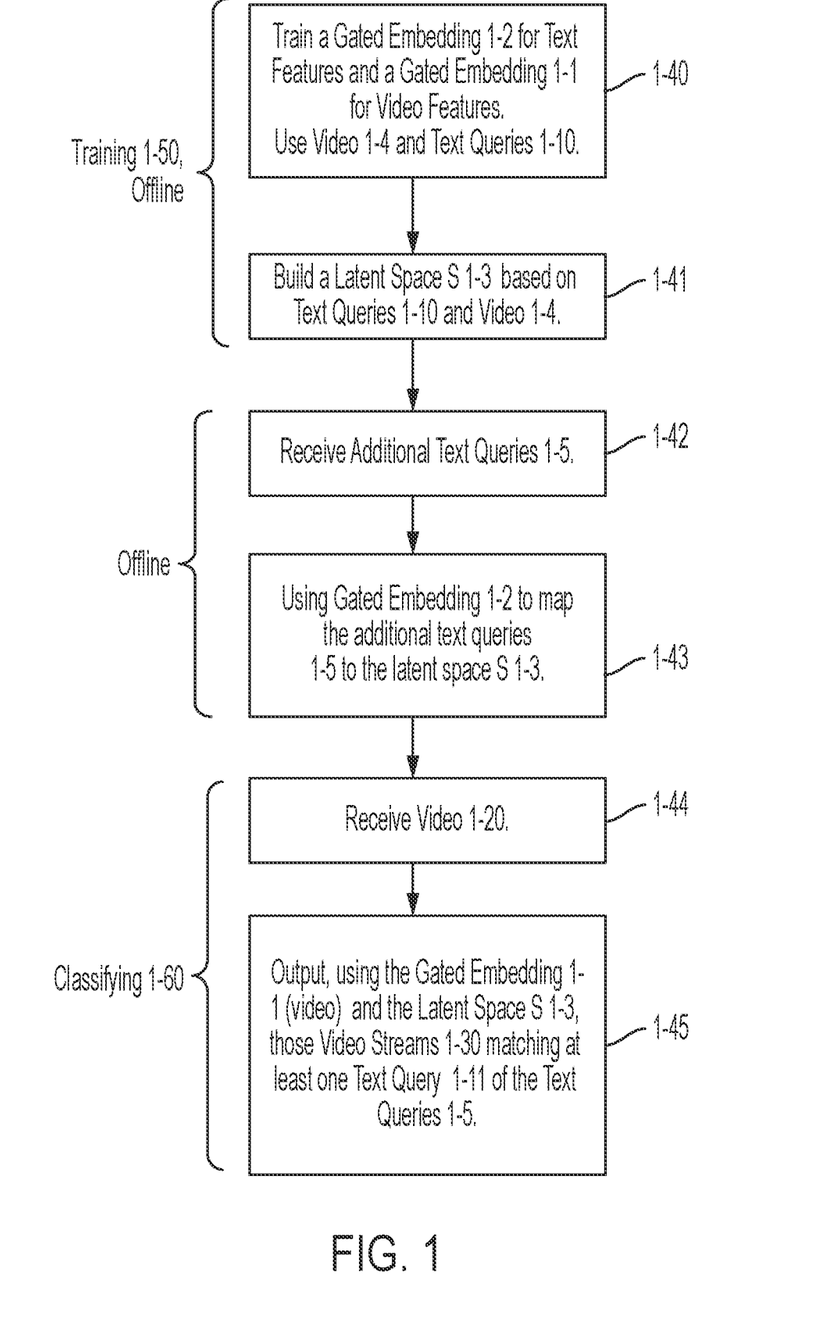
FIG. 1 illustrates a logical flow for training a classifier using embeddings and a space and classifying video streams, according to some embodiments.

FIG. 1 illustrates a logic flow according to some embodiments. The logic flow includes training 1-50 and classifying 1-60.

At 1-40 of the training, the logic flow includes training a gated embedding with weights 1-1 for video features and a gated embedding with weights 1-2 for text features. Video 1-4 is used for the video features and text queries 1-10 are used for the text features. This training may be jointly performed, in some embodiments.

The logic flows from 1-40 to 1-41 at which a latent space S 1-3 is built based on the text queries 1-10 and the video 1-4. Weights related to the embeddings are now fixed and the latent space S 1-3 is now fixed.

At 1-42 of the logic flow, one or more queries, indicated as additional text queries 1-5, may be received. For example, the additional queries 1-5 describe video streams that a person is looking for in a camera output.

The additional text queries 1-5 are mapped, at 1-43, to the latent space S 1-3 using gated embedding 1-2.

Classifying 1-60 begins at 1-44 and continues at 1-45. At 1-44, previously unseen video streams, indicated as video 1-20, in FIG. 1, are received. In some embodiments, video 1-20 is the output of a camera.

At 1-45 the gated embedding with weights 1-1 (video) is used along with the latent space S 1-3 to detect those video streams 1-30 matching at least one text query 1-11 of the text queries 1-5. The video streams 1-30 and/or the matching queries 1-11 are then output, for example, to a display, to be uploaded, to the cloud, to a robot or to an application.

Figure 2A:
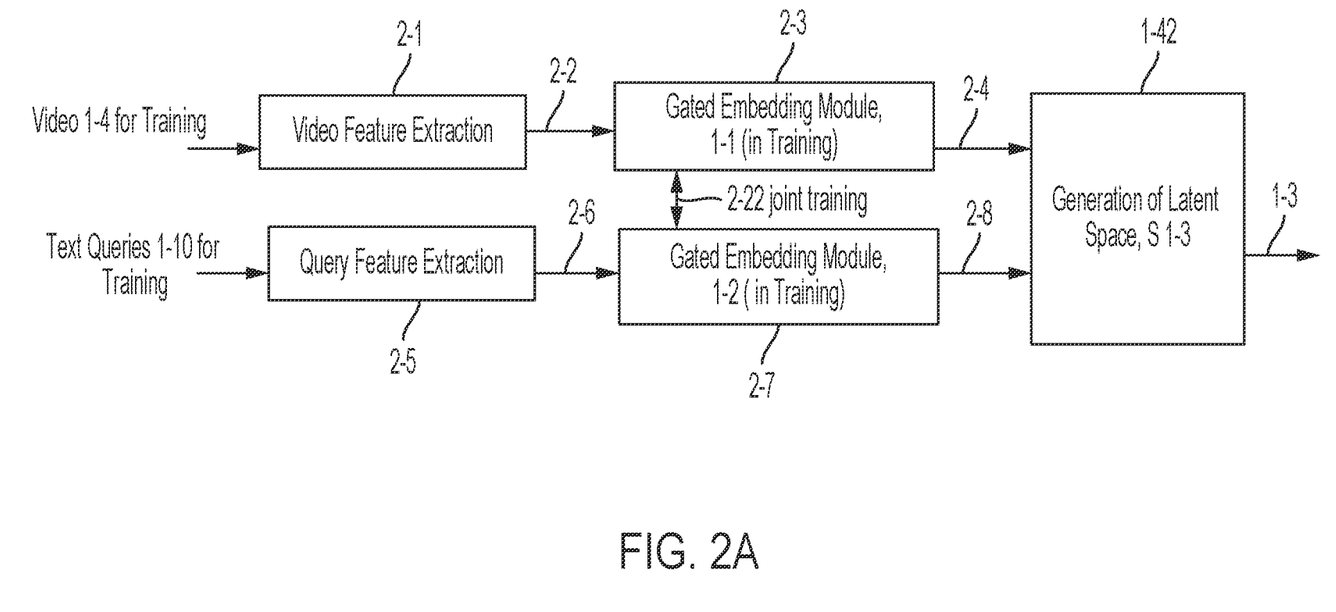
FIG. 2A illustrates training the classifier to obtain video weights, text weights, and a latent space, according to some embodiments.

The generation of the weights used for embedding and the latent space S 1-3 are further described in FIG. 2A.

In FIG. 2A an offline set of videos 1-4 for training is received and processed for video feature generation at 2-1. In some embodiments, each video has a query associated with it, and we learn the similarity between each video-query pair.

The video features 2-2 are processed by the gated embedding with weights 1-1 at 2-3. In general, the weights 1-1 are being adapted and/or trained in FIG. 2A. The video features 2-2 are processed by gated embedding with weights 1-1 to produce mapped video points 2-4 which are used to generate the latent space S 1-3 at 1-42.

Also in FIG. 2A, an offline set of queries 1-10 is received and processed for text feature generation at 2-5. The text features 2-6 are processed by gated embedding with weights 1-2 at 2-7. In general, the weights 1-2 are being adapted and/or trained in FIG. 2A. Also, the weights 1-1 (video) and weights 1-2 (text queries) may be arrived at by joint training 2-22. The text features 2-6 modified by the weights 1-2 provide mapped text points 2-8 used in creating the latent space S 1-3. Each point may be referred to as an index. The processing of the mapped text points 2-8 as indices is represented by 1-42.

Space S 1-3 is built during training and the gated embedding module weights 1-1 (video) and gated embedding module weights 1-2 (text) are saved, see FIGS. 2A and 2B described below.

The embedding module may also be performed with transformers and fully-connected layers. During inference (run-time), the space is empty initially until the testing video input 1-20 processed with fixed weights 1-1 or testing queries 1-5 processed with fixed weights 1-2 is mapped into that space. Once the embeddings for the testing videos and testing queries are in the same space, they become comparable and embodiments can calculate the similarity scores between them.

With normalized video and text embeddings obtained from gated embedding with weights 1-1 and gated embedding with weights 1-2 (see Equations 2-4 below), cosine similarity score $s_i^j$ between the $i^{th}$ video $v_i$ and $j^{th}$ query $q_j$ can be computed. The ground truth query of the $i^{th}$ video is the $i^{th}$ query. Therefore, $s_i^i$ denotes the similarity score for the $i^{th}$ positive pair. Minimization of a bidirectional max-margin ranking loss (see Equation 1) permits jointly learning video-text representations of the latent space S 1-3, according to one embodiment.

Figure 2B:
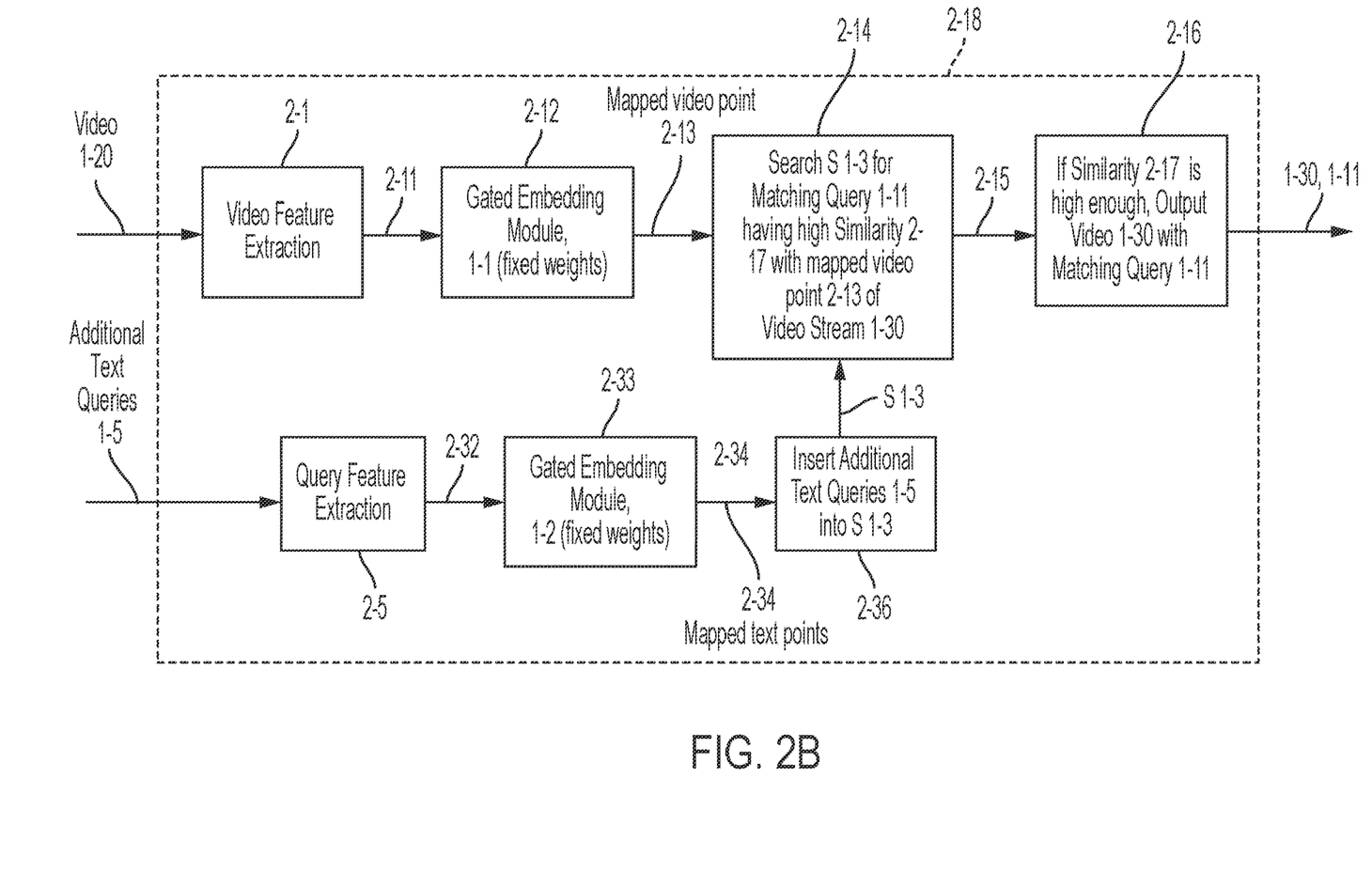
FIG. 2B illustrates operating the classifier on video (real-time or from a player) using the weights and latent space generated in FIG. 2A, including updating the latent space with additional queries, according to some embodiments.

FIG. 2B illustrates operation of the classifier, here denoted generally as 2-18. Video 1-20, possibly real time from a camera, is processed at 2-10 for video feature generation providing video features 2-11. The video features 2-11 are processed through the video gated embedding (2-12) using weights 1-1 (now fixed). The resulting mapped video point 2-13, a video vector, is a point comparable with mapped text points 2-8 and mapped text points 2-34 (indices).

Embodiments map the mapped text points 2-34 and mapped video point 2-13 into the latent space S 1-3. After which, mapped text points 2-34 and mapped video point 2-13 are comparable as they are (without further change, scaling or rotation) in the latent space S 1-3. The latent space S 1-3 consists of points that correspond to the queries of interest by the user (1-5). The mapped text points 2-8 are used in training to build the latent space but will not be kept during inference. In general, embodiments add new mapped text points 2-34 during inference.

Thus, the latent space S 1-3 is built during training. The function of the gated embedding module 2-12 (video) and gated embedding module 2-33 (text), considered together, is to map semantically similar points closer together in that space. However, during inference time, the only points that will be in the latent space are the additional text queries 1-5 that the user is interested in. These queries are converted into embeddings offline, and then mapped to the latent space S 1-3 to compare with the incoming video segments. The text queries 1-10 used in training will not be in the latent space S 1-3 at inference time.

At Finding Similarities 2-14, a search is made in the latent space S 1-3 to see which point or points are closest to mapped video point 2-13 by determining similarity measures 2-17. The similarity is determined by cosine similarity between a video and a text embedding. At 2-16, if a similarity measure 2-17 for a query 1-11 corresponding to a point in the latent space S 1-3 exceeds a threshold, then the video 1-30 corresponding to the mapped video point 2-13 and the matching query 1-11, possibly represented as an index, are output. The video 1-30 may be different from the initial video input 1-20, and could be a segment of the input video stream 1-20 that matched with the query. Matching query 1-11 is, in general, a text query from the set of additional text queries 1-5.

FIG. 2B illustrates the addition of the additional text queries 1-5 to the latent space S 1-3. All the additional queries from the set 1-5 are processed by query feature extraction 2-5 to produce query text features 2-32. The query text features 2-32 are processed through gated embedding 2-33 with weights 1-2 (now fixed). The resulting mapped text points 2-34 for multiple queries are inserted into the latent space S 1-3 as additional indices and the updated latent space S 1-3 is used at 2-14 for classification. This addition of a point in latent space S 1-3 may be referred to herein as augmentation of the latent space 1-3. Video segments matching a query of the additional queries 1-5 may be output from 2-16 as video 1-30 and matching query 1-11 (now matching, in some instances, a query of the additional queries 1-5).

Figure 3:
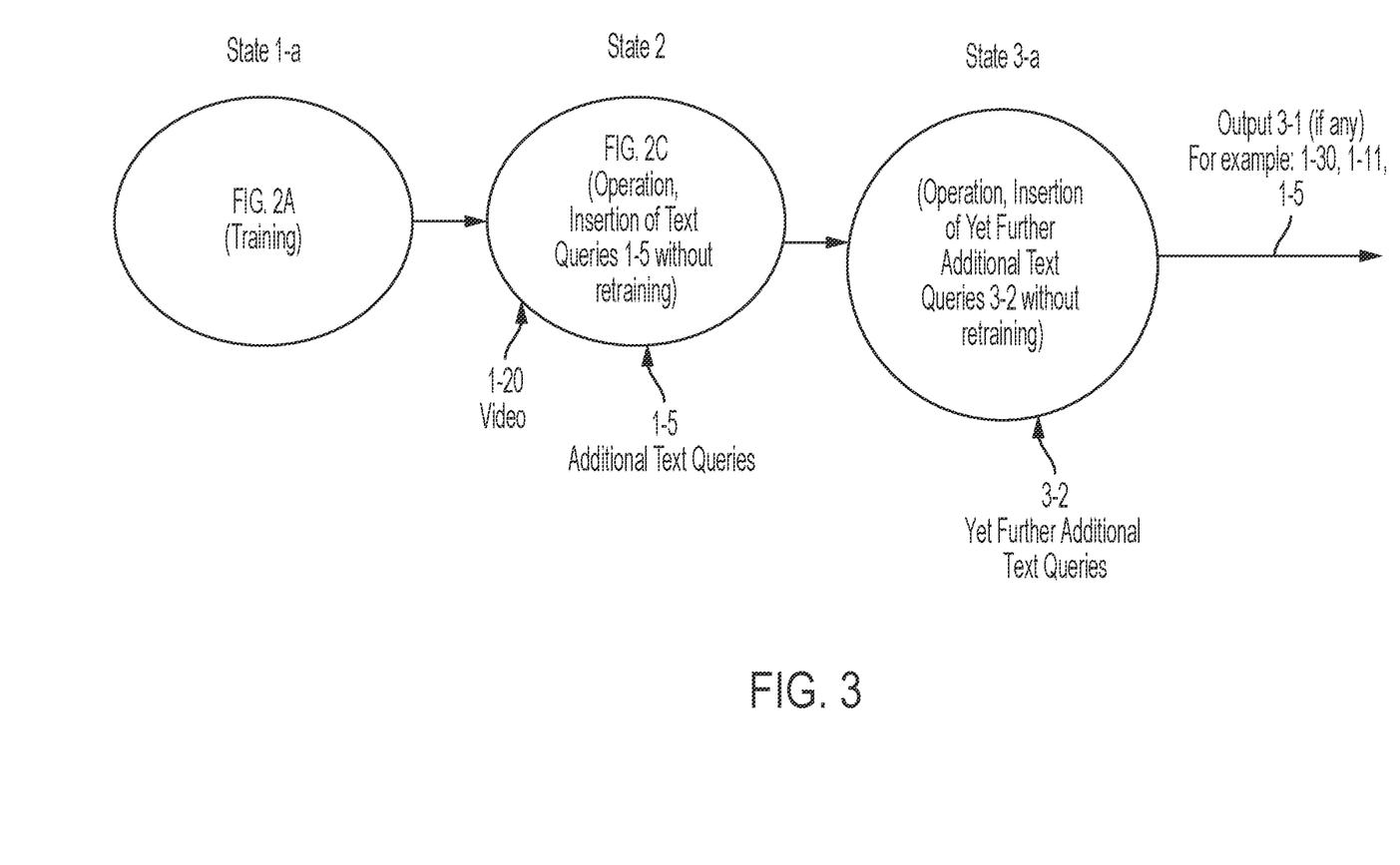
FIG. 3 illustrates states of training, operation, accepting yet further additional queries without retraining the weights and again operating the classifier, according to some embodiments.

FIG. 3 illustrates adding an additional query without retraining.

In FIG. 3, at state 1-a, the features of FIG. 2A are practiced to train the weights 1-1 and 1-2 and create the latent space S 1-3. At state 2, the features of FIG. 2B are practiced to perform classification and output (if one or more similarities are sufficiently high) video segments and/or matching queries.

In FIG. 3, state 1-a represents performing the training of FIG. 2A. State 2 represents performing the operations of FIG. 2B on video 1-20, and generally producing classifications with sufficiently high similarities from the latent space S 1-3.

For example, in some embodiments, a flow of processing is as follows:
(1) train the network;
(2) add the user-interested queries to the latent space offline;
(3) in real time, match incoming video segments to the offline query embeddings, (new queries are supported if the user wishes to add more).

State 2 of FIG. 3 represents receiving additional text queries 1-5 and inserting them, see 2-36 of FIG. 2B, into the latent space S 1-3. State 3-a also represents processing video 1-20 and searching for sufficiently high similarities, see FIG. 2B 2-14. FIG. 3 indicates as an output 3-1 which may include one or more of a matching video stream 1-30, a general matching query 1-11 and/or a matching query from the set of additional text queries 1-5 may be output.

Embodiments of FIG. 3, along with receiving additional text queries 1-5 before operation of the classifier (FIG. 1 1-42, FIG. 2B and FIG. 3 state 2), illustrates receiving yet further additional text queries 3-2 after operation has commenced (FIG. 3 state 3-2, FIG. 2B with insertion/augmentation 2-36, followed by search of latent space S 1-3 for matches).

Figure 4:
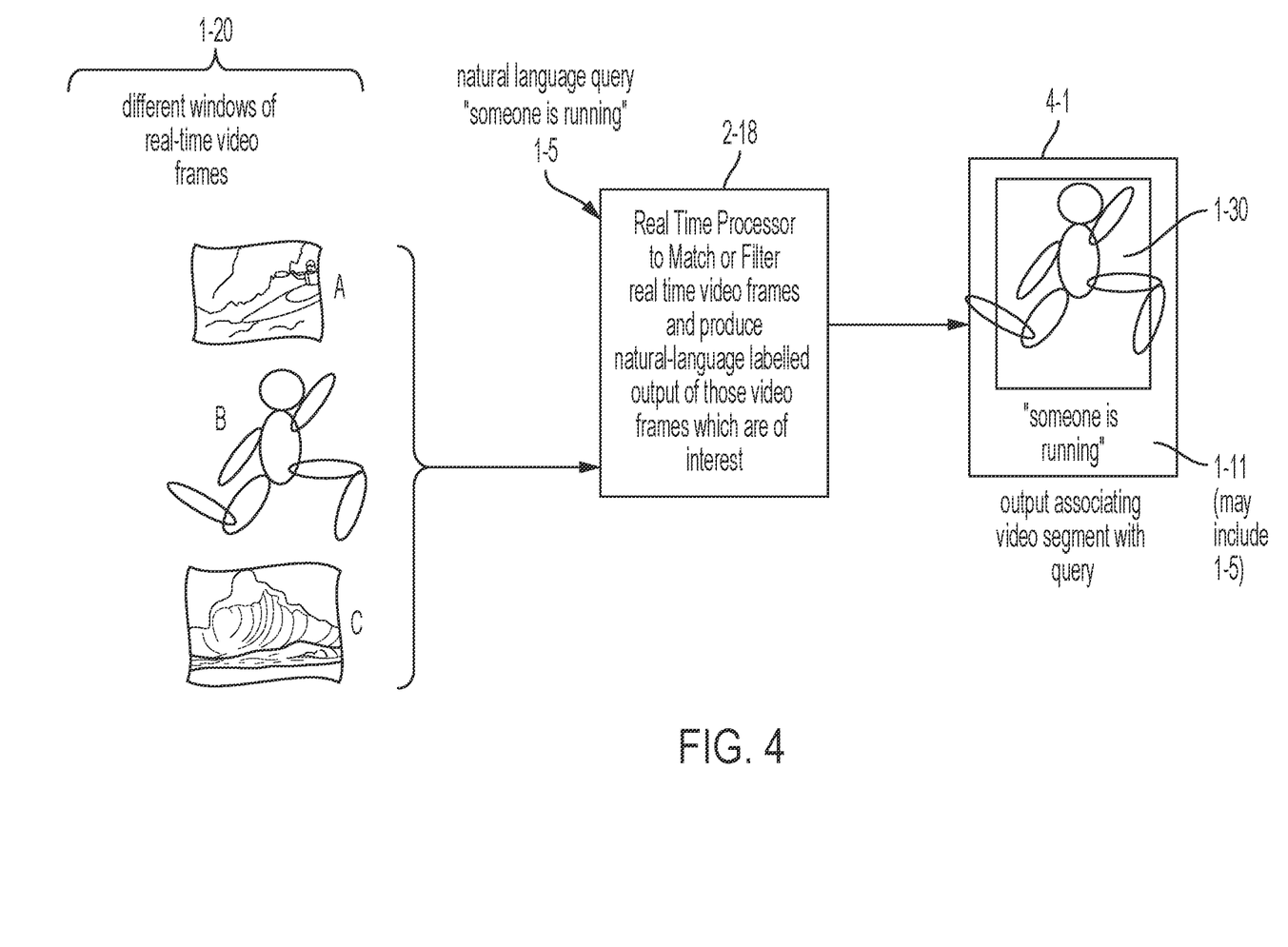
FIG. 4 illustrates operation of the classifier and producing a tangible useful output including a video segment, according to some embodiments.

FIG. 4 illustrates overall operation of the classifier 2-18, which includes, in some embodiments, one or more processors. An additional text query in the form of natural language, here indicated as 1-5, is input to the classifier 2-18. The general label for a matching query is 1-11, which, in some instances, may be the new text query 1-5 (or 1-11 may be some other query in the system). In this example, the natural language query is "someone is running." Video 1-20 is input to the classifier 2-18. The example video 1-20 includes: A) someone in a kayak, B) someone running, and C) an ocean wave.

The classifier 2-18, a processor, matches or filters real time video frames to produce natural-language labelled output of those video frames which are of interest.

Figure 5:
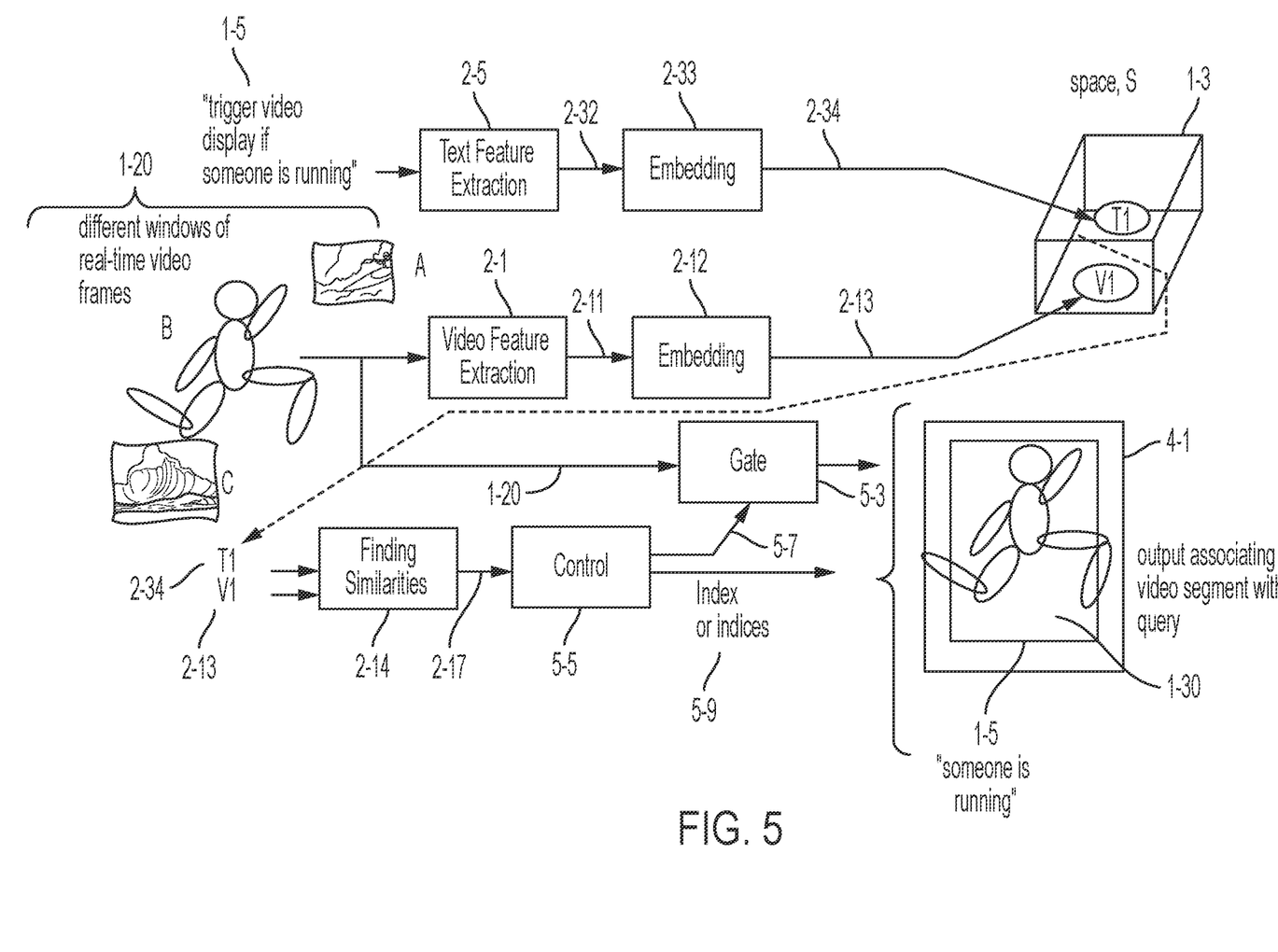
FIG. 5 illustrates operating the classifier including control of possibly placing video data as output for upload on a network, according to some embodiments.

FIG. 5 provides further details of an embodiment. One or more additional queries, indicated here as 1-5, are input to text feature extraction 2-5. The additional text queries 1-5 include the command "trigger video display if someone is running." Text features 2-32 are output and processed at 2-33 by gated embedding 1-2 (fixed text weights). A mapped text point of the mapped text points 2-34 is produced which represents a point T1 in the latent space S 1-3.

Various video 1-20 input to video extraction 2-1 including the video stream represented by the annotation B corresponding to, in this example, someone running. FIG. 5 illustrates that the video 1-20 is also input to a gate 5-3 which controls upload of video data. The purpose of the gate 5-3 is to limit, for example, uploading of real-time camera output to informative video and to discard uninformative video. Whether something is information or uninformative depends on if the video data in question has a high similarity with a text query of interest. In the example of FIG. 5, there is one text query of interest, additional text query 1-5, which is "someone is running" in this example.

As mentioned above, video 1-20, including videos A, B and C is input to video extraction 2-1 which produces video features 2-11. The video features 2-11 are processed at 2-12 by the gated embedding with weights 1-1 (fixed video weights). A vector is produced for each video A, B and C and compared with points in the latent space S 1-3. An example vector from 2-12 (video) is shown as point V1 in the latent space S 1-3 in FIG. 5.

In FIG. 5, control 5-5 determines whether one or more of the videos of video 1-20 will be output. Control 5-5 represents a control decision conveyed by signal 5-7 and gate 5-3 represents a multiplexing action of either outputting a selected video of video 1-20 or not allowing output of a non-selected video of video 1-20. Mechanisms for signaling a multiplexing action can be performed in conventional fashion, for example, using software or hardware. Thus uninformative video segments need are filtered out and only relevant frames are passed to the cloud, for example.

Figure 6:
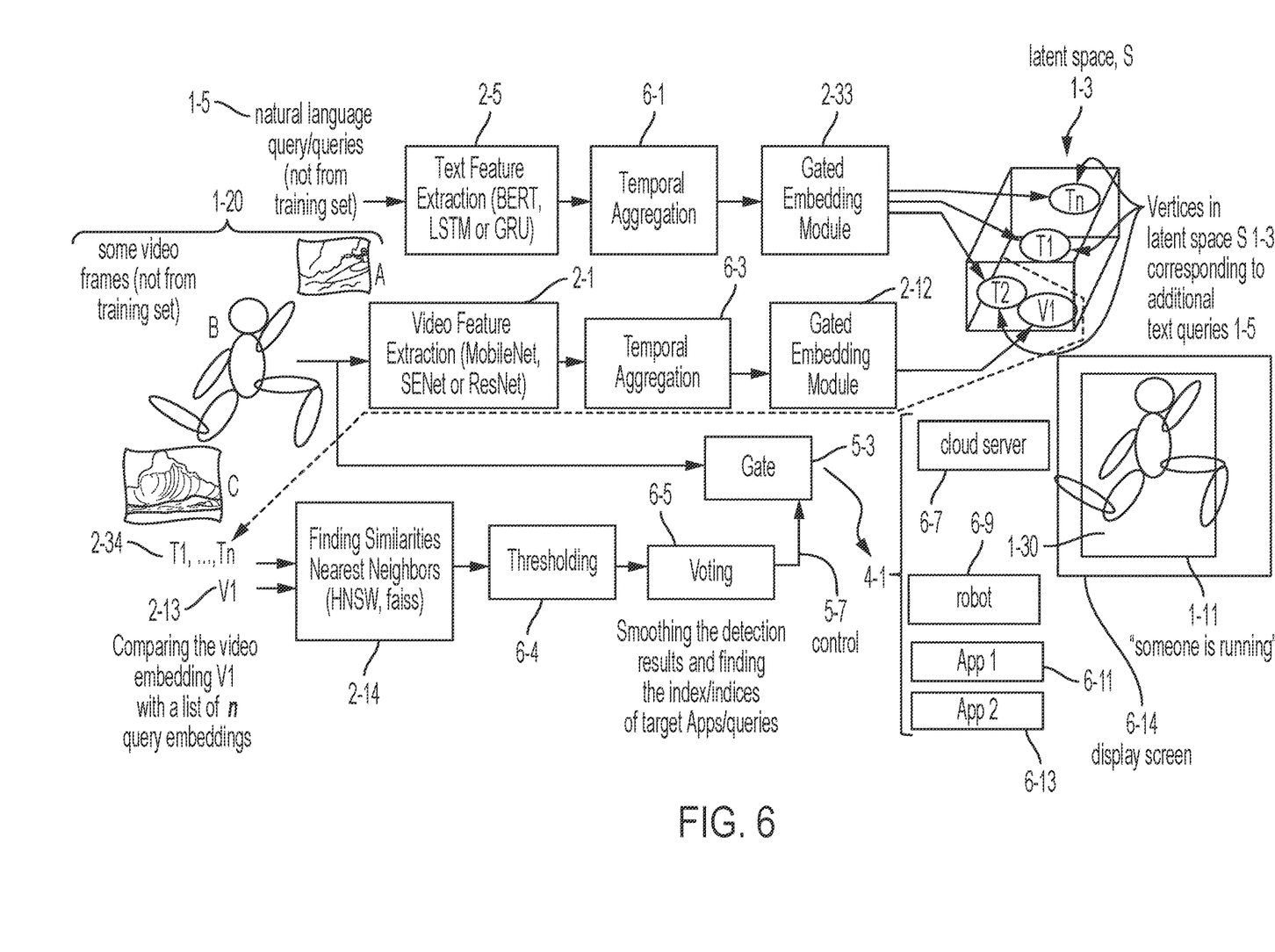
FIG. 6 illustrates operating the classifier and providing results to a variety of downstream networks, devices or applications, according to some embodiments.

FIG. 6 provides further details of various embodiments of FIG. 5. Items which are familiar from FIG. 5 will not be described again in FIG. 6.

As shown in FIG. 6, text feature extraction 2-5 may be performed by BERT, LSTM ("Long Short Term Memory") or GRU ("Gated Recurrent Unit").

For example, for each query a pretrained BERT model may be used to obtain the word embeddings for word of an additional text query 1-5.

In FIG. 6, video feature extraction 2-1 may be performed by MobileNet, SENet or ResNet.

FIG. 6 introduces temporal aggregation 6-1 after text feature extraction 2-5 and before gated embedding module 2-33. Aggregation allows temporal correlations to be exploited. For example, someone with their hand up (single frame) can be distinguished from someone waving (which can only be recognized through multiple frames).

Thus, some embodiments include aggregating video features over a collection of video frames to form aggregated video features, and forming, based on the aggregated video features, a vector in the latent space S 1-3. Also, some embodiments include aggregating text features over a collection of words to form aggregated text features; and forming, based on the aggregated text features, a second vector in the latent space S 1-3.

A window-based approach, which processes a window of frames altogether, also avoids redundant comparisons since individual scores do not need to be computed for consecutive frames of nearly identical features.

Referring again to FIG. 2A, FIG. 2A also indicates joint training 2-22 between the gated embedding module 2-7 (text queries) and the gated embedding module 2-3 (video). Loss is a combination of similarities (see Eq. 1) below, using embeddings in the latent space S 1-3, which is used to backpropagate the loss into the network to update the weights 1-1 for the video gated embedding and the weights 1-2 for the text gated embedding.

$$L = \frac{1}{N} \sum_{i=1, j \neq i}^{N} \max(0, m + s_{i,j} - s_{i,i}) + \max(0, m + s_{j,i} - s_{i,i}) \qquad \text{Eq. (1)}$$

The illustration of the latent space S 1-3 in FIG. 6 provides further detail. Vertices mapped from the additional text queries 1-5 are shown as open ellipses with a "T" inside. The mapping of a video from video 1-20 is shown as an ellipse with a "V" inside. An example of a latent space made up of vertices and edges of a graph is given in FIG. 8 below.

At 2-14 in FIG. 6, Finding Similarities 2-14 is performed using, for example, HNSW (hierarchical navigable small world) or faiss (a library for efficient similarity search and clustering of dense vectors from Facebook of Menlo Park, Calif.).

FIG. 6 shows further embodiments for processing the similarities found at 2-14. First, thresholding 6-4 is performed to retain only similarities above a predetermined similarity threshold. Then, in some embodiments, voting may be performed. Each similarity above the threshold may be counted as a vote, and a predetermined number of attempted votes collected. If the accumulated votes exceed a voting threshold, then a positive control signal 5-7 is provided to gate 5-3 and a selected video 1-30 from the videos 1-20 is passed to the output 4-1. If no videos 1-20 survived the thresholding and voting, then the output 4-1 is empty.

Output 4-1 may be uploaded to a cloud server 6-7, provided as input to a robot 6-9 (for example a home robot which responds to the recognized content of video 1-20 only when necessary), or one or more applications 6-11, 6-13 in a computing device such as a smart phone, a tablet computer, or a desktop computer. Example applications are security alarm systems, robots and augmented reality glasses. The transmission of 4-1 from 5-3 to 6-7, 6-9, 6-11 or 6-13 may be wired or wireless. An example of a wired transmission is the USB protocol over a cable. Examples of wireless transmission are cellular phone standards, Wi-Fi and Bluetooth.

In FIG. 6, applications 6-11 and 6-13 may represent two tasks. Application 6-11 may be user-defined in part by the additional query 1-5. A task associated with application 6-11 is only performed, in some embodiments, when a particular text query associated with application 6-11 is output as a part of output 4-1.

In some embodiments, output 4-1 includes a human-readable text string corresponding to the index associated with 1-11. The display screen may be configured to display the selected video 1-30 annotated by the human-readable text string corresponding to the index 1-11, thereby providing a viewing person a readable caption of the plurality of video frames displayed on the display screen.

At a later time, perhaps a second later, a different portion of a video may be identified with a different point in the latent space S 1-3. The different point is identified and the displayed caption for the viewing person changes for the new video feature recognition.

As an example, in a video of person kayaking through rapids (tumbling white water with many turbulent waves of water), the person may rotate under water and pop up again in a matter of one second or so. Embodiments provide identifications of "a kayak" and "a person's face" in real time as the kayak progresses through the rapid white water. Also, embodiments provide for identification of more complicated queries. In a diving example, a competition is viewed by judges and swimmers dive from a diving board. In the diving example, distinct events would be supported (e.g. "a girl diving off a board" and "judges holding up the scores").

Figure 7A:
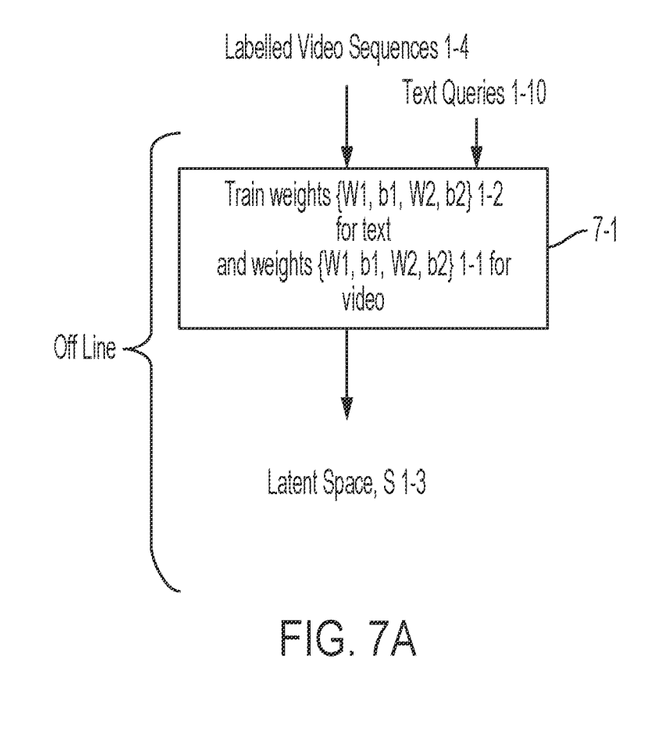
FIG. 7A illustrates training the classifier offline, according to some embodiments.
Figure 7B:
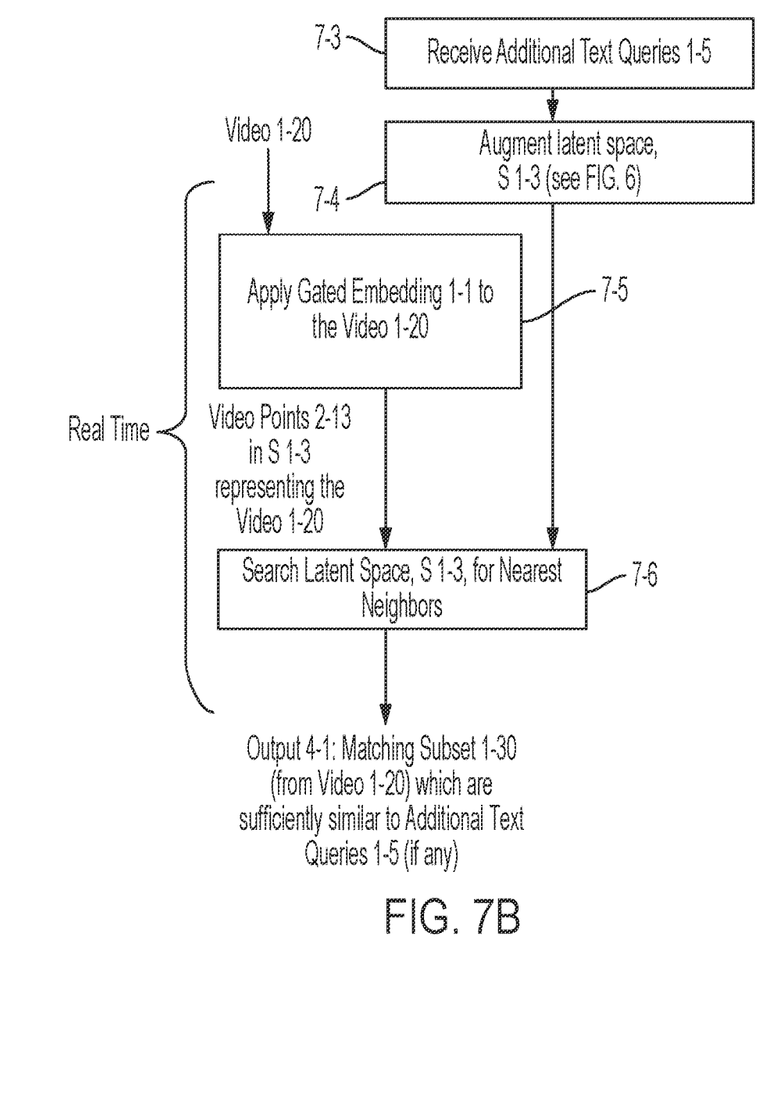
FIG. 7B illustrates operating the classifier in real-time, according to some embodiments.

FIGS. 7A and 7B illustrate additional logic flows for off line and real time procedures, according to some embodiments.

In the example of FIG. 7A, video 1-4 includes labelled video sequences used for off line training. At 7-1, gated embedding 1-2 includes weights $\{W_1, b_1, W_2, b_2\}$ and these are trained offline.

Here $W_1 \in R^{d2 \times d1}$, $W_2 \in R^{d2 \times d2}$, $b_1 \in R^{d2}$ and $b_2 \in R^{d2}$ are learnable parameters given the dimension of the input features to be d1 and dimension of the output to be d2. σ is the element-wise sigmoid activation and is the element-wise multiplication.

$$E_1 = W_1 E_0 + b_1 \qquad \text{Eq. (2)}$$

$$E_2 = E_1 \circ \sigma(W_2 E_1 + b_2) \qquad \text{Eq. (3)}$$

$$E = \frac{E_2}{\|E_2\|} \qquad \text{Eq. (4)}$$

Eq. (2) projects the features into the joint embedding space with a linear layer. The output is passed into a non-linear context gating layer shown in Eq. (3). The result is L2-normalized as shown in Eq. (4). The motivation behind the gating function in Eq. (3) is two-fold. First, it introduces non-linearities into the model. Second, it reweights the strengths of the activations in E1 to highlight and suppress information given the context of the video and query.

Consider the query "a dog is biting the curtains" and a video clip of a dog doing so. Although the video frames may contain other objects such as furniture or outdoor scenery, the visual activations for these features are downweighted given the context of the query, while the features for the dog and the curtain are strengthened.

The mathematical form of $\{W_1, b_1, W_2, b_2\}$ is used for both embedding with weights 1-1 (video) and embedding with weights 1-2 (text). The values of these variables are different between text and video based on training. Also the associated dimensions, d1 and d2 mentioned before Eq. 2, are in general different for embedding with weights 1-1 and embedding with weights 1-2.

FIG. 7B illustrates aspects which are not offline.

One or more queries is entered at 7-3, for example, by a user of the classifier 2-18. These are additional text queries 1-5. An example of the additional text query 1-5 in previous figures is "someone is running." At 7-4, the latent space S 1-3 is augmented and the open ellipses marked with a "T" of FIG. 6 come into existence.

Real time processing of video then commences at 7-5. Video 1-20 is received and that gated embedding with weights 1-1 is applied to the video 1-20. Video points 2-13 in latent space S 1-3 representing the video 1-20 are produced (marked with a "V" in an ellipse in FIG. 6).

At 7-6, a search of the latent space S 1-3 for nearest neighbors to the points 2-13 is performed.

Before discussing performance metrics, the speed-up provided by the search of latent space S 1-3 for processing real time video is discussed, for one example embodiment.

Figure 8:
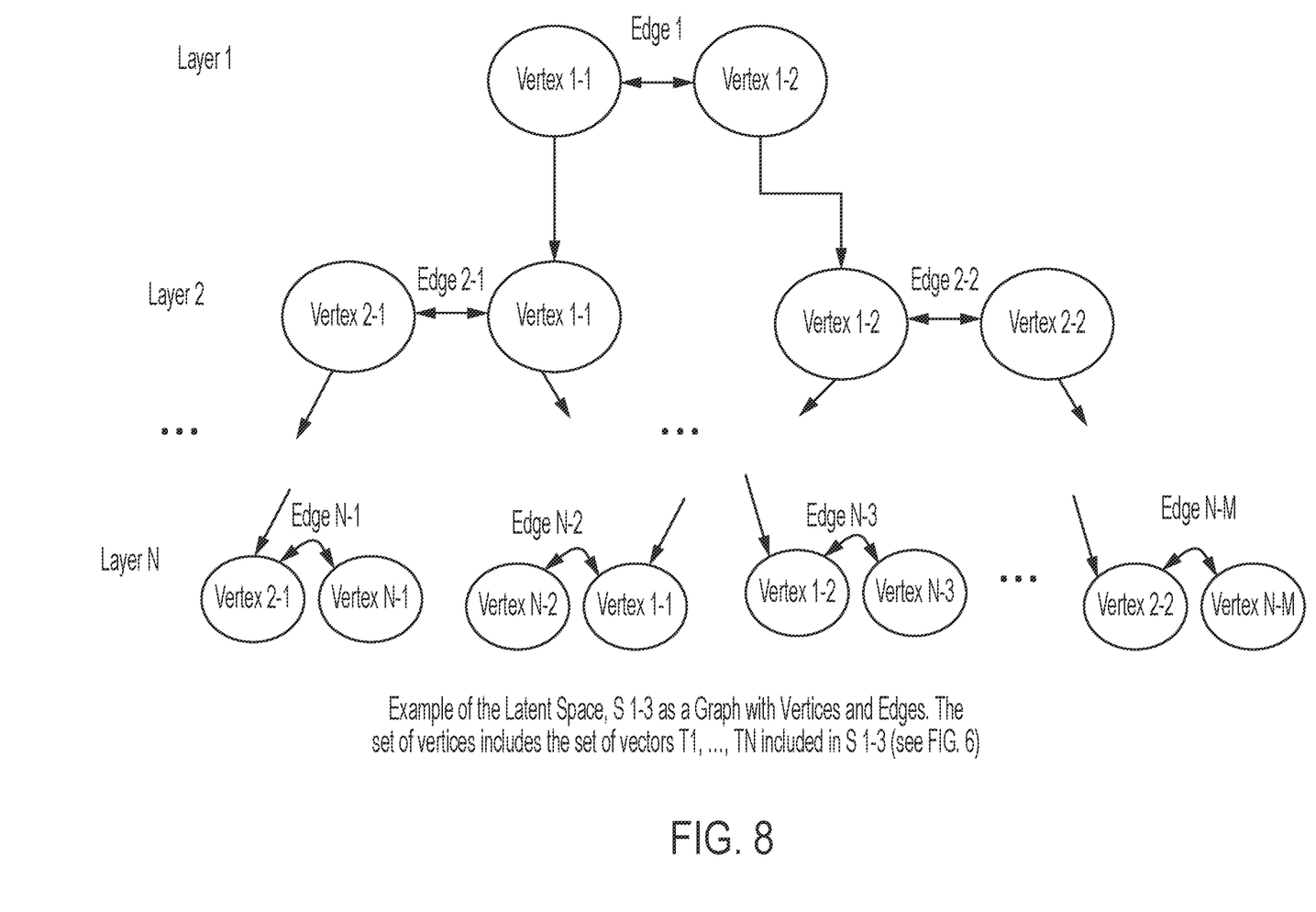
FIG. 8 illustrates a graph useful to represent a latent space, the graph including vertices and edges which may be identified by an index, according to some embodiments.

A logarithmic search time, rather than linear with queries, as the number of queries increases is, in some embodiments, based on a graph structure of latent space S 1-3 as shown in FIG. 8. The graph includes layers 1, 2, . . . . N. Each layer includes vertices and edges. A first digit is used for a layer and a second digit is used for a vertex within that layer ("layer-vertex"). Between layers, some vertices appear again. For example, vertex 1-1 appears at layer 1 and all lower layers. Vertex 2-1 appears for the first time at layer 2 and then appears in all lower layers. The labelling of the vertices and edges is based on layer. There is no specific relationship of "layer-vertex" to figure item numbers appearing elsewhere such as weights 1-1 and weights 1-2.

Layer 1 includes vertex 1-1 and vertex 1-2 connected by edge 1.

Layer 2 includes vertex 2-1 and vertex 1-1 connected by edge 2-1. Layer 2 also includes vertex 1-2 and vertex 2-2 connected by edge 2-2.

At a bottom layer, layer N, the vertices from above appear, as well as vertices vertex N-1, vertex N-2, vertex N-3 and vertex N-M. Associated with these, respectively, are edge N-1, edge N-2, edge N-3 and edge N-M.

This graph is schematic in nature and does not represent the detailed structure of a graph representing the latent space. The graph itself is built offline after training and has a somewhat random appearance driven by the training data. In FIG. 8, which is schematic and does not represent actual data in detail, each step down in a layer doubles (this is an example for illustration) the number of points searched over. Thus, FIG. 8 indicates the real-life logarithmic nature of an actual search.

When video frames are processed, a point V such as 2-13 of FIG. 5, is compared at layer 1 with the two vertices, and the nearest one chosen. The algorithm then descends to the layer below and inspects other vertices connected by edges to the vertex selected at layer 1. If a close neighbor is found, the closer neighbor is now the candidate solution. This is repeated throughout the layers to complete the search. The structure of FIG. 8 illustrates that the number of comparisons needed does not scale with the number of vertices (the total number of text queries in the training set 1-10 or in the testing set 1-5) in the bottom layer, but rather the search effort (and thus time) scales with the number of layers, N.

After the embeddings for a window of frames are mapped into the latent space S 1-3 (which is joint space in which text queries and video streams can be associated properly), the last step is to search for the query with the highest cosine similarity score to the video segment. The simplest approach would be to return the highest score between the set of frames and every predefined trigger. However, this scales linearly with the number of queries and does not leverage the fact that the text embeddings are computed ahead of time. Therefore, embodiments adopt the approximate nearest neighbor search system to speed up the process of identifying the query with the highest cosine similarity score, according to one embodiment. A distinctive idea in HNSW is to build a hierarchical set of graphs (layers) with nested subsets of nodes in each layer; also see FIG. 8, discussed above. The links are separated into different layers by their distance scales. The algorithm has logarithmic time complexity, which reduces the overall computation cost and offers better scalability compared to the naive approach. (also see 2-14 in FIG. 6 and associated discussion).

A matching subset 1-30, if any, from video 1-20 is identified as output 4-1.

Embodiments have been evaluated for metrics including Event F1 score, bandwidth consumption and runtime efficiency.

Event F1 score is the harmonic mean of precision and event recall. Precision is the fraction of true positive examples classified by a classifier as positive divided by the number of false positives plus true positives. Recall is the fraction of examples classified as positive among the total number of positive examples. Event recall is defined based on parameters Existence(i) and Overlap(i). Existence(i) is 1 if detect any frame in event i, otherwise Existence(i) is 0.

$$\text{Overlap}(i) = \sum \frac{|\text{Intersect}(G(i), P(i))|}{|G(i)|} \qquad \text{Eq. (5)}$$

$$\text{Recall}(i) = \alpha \, \text{Existence}(i) + \beta \text{Overlap}(i) \qquad \text{Eq. (6)}$$

G(i) and P(i) are the ground truth frames and predicted frames for Event(i). In an example, $\alpha$ is 0.9 and $\beta$ is 0.1.

Embodiments provide an improvement in Event F1 score. For example, embodiments provide an improvement in properly identifying video streams 1-20 which should be provided in output 4-1. The improvement in filtering ability is because embodiments encode the video and text data into high dimensional vector representations to learn semantically similar pairs in search for the best match. On the other hand, binary classifiers can only output discrete labels to recognize simple objects, which is problematic even in the case of simple queries such as "a person is cooking."

Also, embodiments provide better use of bandwidth when uploading. For example, a comparison of the proportion of positive frames and negative frames sent to the cloud in embodiments to benchmark approaches. Binary classifiers in comparative approaches are unable to learn simple queries such as "a man is talking" and mistakenly identify nearly all the frames as positive. Hence, the false positive rate in comparative approaches is higher than for embodiments provided herein. Overall, embodiments reduce bandwidth consumption by around 80% compared to comparative approaches.

Embodiments provide good real-time performance not seen in any other system.

Figure 9:
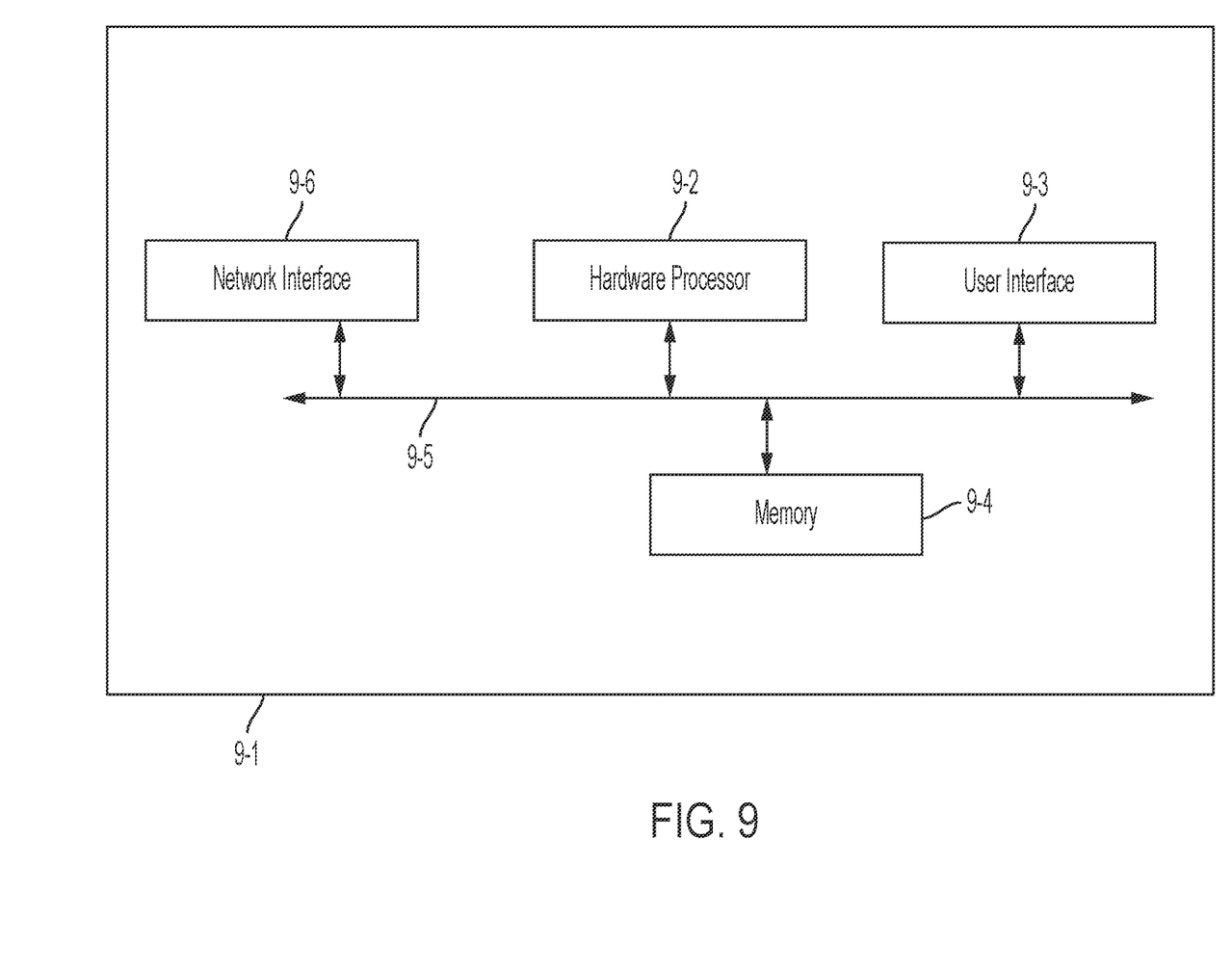
FIG. 9 illustrates an apparatus, according to some embodiments.

FIG. 9 illustrates an exemplary apparatus 9-1 for implementation of the embodiments disclosed herein. The apparatus 9-1 may be a server, a computer, a laptop computer, a handheld device, or a tablet computer device, for example. Apparatus 9-1 may include a hardware processor 9-2. The hardware processor may be an ASIC (application specific integrated circuit), CPU (for example CISC or RISC device), or custom hardware. Apparatus 9-1 also may include a user interface 9-3 (for example a display screen and/or keyboard and/or pointing device such as a mouse). Apparatus 9-1 may include a memory 9-4. The memory 9-4 may be a non-transitory computer readable medium storing instructions for execution by the hardware processor 9-2 to cause apparatus 9-1 to perform any of the methods of embodiments disclosed herein.

In some embodiments, the exemplary apparatus 9-1 is an edge server. The edge server may include, for example, 8 GB of GPU memory and a CPU running at 3.3 GHz with ten cores. Alternatively, the exemplary apparatus may include a device such as an NVIDIA Jetson Nano from NVIDIA of Santa Clara, Calif., USA.

What is claimed is:

1. A method of reducing, at a network edge, transmission bandwidth of video information of a video stream, the method comprising:
    extracting video features of a first portion of the video stream, the first portion of the video stream comprising a first plurality of video frames and corresponding to a first time period;
    forming, based on the video features, a first vector in a latent space;
    computing a first index of a first match of the first vector in the latent space, wherein a first similarity score is associated with the first index and the first match corresponds to a second vector in the latent space;
    determining if the first similarity score exceeds a similarity threshold; and
    when the similarity threshold is exceeded, transmitting first data related to the first index;
    wherein the second vector is pre-determined by:
        extracting text features of a natural language query, and
        forming, based on the text features, the second vector in the latent space.

2. The method of claim 1, wherein the first data comprises a plurality of video frames corresponding to the first time period and the first index.

3. The method of claim 2, wherein the transmitting comprises transmitting the first data to a cloud server.

4. The method of claim 2, wherein the transmitting comprises transmitting the first data to an application.

5. The method of claim 4, wherein the application is installed in a robot, the first data comprises the first index and the robot is configured to perform a task based on the first index.

6. The method of claim 1, further comprising:
    counting each similarity score of the first index exceeding a threshold during a voting time period as one vote of a plurality of votes; and
    only performing the transmitting when a count of the plurality of votes exceeds a vote threshold.

7. The method of claim 1, wherein the transmitting the first data related to the first index comprises transmitting the video stream and a text string corresponding to the first index as a portion of the transmission bandwidth.

8. An apparatus comprising a processor and memory, wherein the processor is positioned at a network edge for reducing transmission bandwidth of video information of a video stream, the memory comprising instructions, wherein the processor is configured to:
    extract video features of a first portion of the video stream, the first portion of the video stream comprising a first plurality of video frames and corresponding to a first time period;
    form, based on the video features, a first vector in a latent space;
    compute a first index of a first match of the first vector in the latent space, wherein a first similarity score is associated with the first index and the first match corresponds to a second vector in the latent space;
    determine if the first similarity score exceeds a similarity threshold; and
    when the similarity threshold is exceeded, transmit first data related to the first index;
    wherein the processor is further configured to pre-determine the second vector by:
        extracting text features of a natural language query, and
        forming, based on the text features, the second vector in the latent space.

9. The apparatus of claim 8, wherein the first data comprises a plurality of video frames corresponding to the first time period and the first index.

10. The apparatus of claim 9, wherein the processor is further configured to transmit the first data to a cloud server.

11. The apparatus of claim 9, wherein the processor is further configured to transmit the first data to an application.

12. The apparatus of claim 11, wherein the application is installed in a robot, the first data comprises the first index and the robot is configured to perform a task based on the first index.

13. The apparatus of claim 8, wherein the processor is further configured to:
    count each similarity score of the first index exceeding a threshold during a voting time period as one vote of a plurality of votes; and
    only transmit the first data when a count of the plurality of votes exceeds a vote threshold.

14. The apparatus of claim 8, wherein the processor is further configured to transmit the video stream and a text string corresponding to the first index as a portion of the transmission bandwidth.

15. A non-transitory computer readable medium comprising instructions, the instructions configured to cause one or more processors to:
    extract video features of a first portion of a video stream, the first portion of the video stream comprising a first plurality of video frames and corresponding to a first time period;
    form, based on the video features, a first vector in a latent space;
    compute a first index of a first match of the first vector in the latent space, wherein a first similarity score is associated with the first index and the first match corresponds to a second vector in the latent space;
    determine if the first similarity score exceeds a similarity threshold; and
    when the similarity threshold is exceeded, transmit first data related to the first index;

wherein the second vector is pre-determined by:
  extracting text features of a natural language query, and
  forming, based on the text features, the second vector in the latent space.

16. The non-transitory computer readable medium of claim 15, wherein the first data comprises a plurality of video frames corresponding to the first time period and the first index.

17. The non-transitory computer readable medium of claim 16, wherein the instructions are further configured to cause one or more processors to transmit the first data to a cloud server.

18. The non-transitory computer readable medium of claim 16, wherein the instructions are further configured to cause one or more processors to transmit the first data to an application.

19. The non-transitory computer readable medium of claim 18, wherein the application is installed in a robot, the first data comprises the first index and the robot is configured to perform a task based on the first index.

20. The non-transitory computer readable medium of claim 18, wherein the instructions are further configured to cause one or more processors to:
  count each similarity score of the first index exceeding a threshold during a voting time period as one vote of a plurality of votes; and
  only transmit the first data when a count of the plurality of votes exceeds a vote threshold.

* * * * *